United States Patent Office 3,449,333
Patented June 10, 1969

3,449,333
ARYLPYRAZOLYL-(1)-STILBENE COMPOUNDS
Alfons Dorlars and Otto Neuner, Leverkusen, Germany, assignors to Farbenfabriken Bayer Aktiengesellschaft, Leverkusen, Germany, a corporation of Germany
No Drawing. Filed Aug. 3, 1967, Ser. No. 658,048
Claims priority, application Germany, Aug. 10, 1966, F 49,916; Jan. 7, 1967, F 51,197
Int. Cl. C07d 49/10; C09k 1/02
U.S. Cl. 260—240                  8 Claims

ABSTRACT OF THE DISCLOSURE

Brightening agents useful in brightening such materials as cellulose materials or synthetic materials comprising arylpyrazolyl-(1)-stilbene compounds of the formula

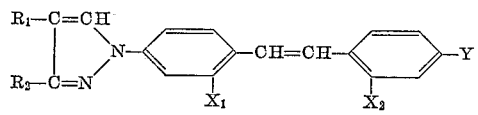

in which $R_1$ and $R_2$ independently of one another stand for hydrogen, a lower alkyl radical or an optionally substituted aryl radical, with the proviso that at least one of the symbols $R_1$ or $R_2$ stands for an optionally substituted aryl radical, while $X_1$ and $X_2$, independently of one another, denote hydrogen, the sulphonic acid group or a salt thereof, a sulphonic acid ester group, an optionally substituted sulphonic acid amide group, an alkylsulphone or arylsulphone group, the carboxylic acid group or a salt thereof, a carboxylic acid ester group, an optionally substituted carboxylic acid amide group or cyanogen, and Y stands for hydrogen, an acylated amino group, an optionally substituted pyrazolyl, triazolyl-(1), benzotriazolyl or naphthotriazolyl group.

---

The object of the present invention comprises Arylpyrazolyl-(1)-stilbene compounds of the formula

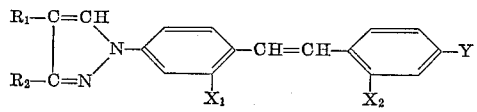 (I)

in which $R_1$ and $R_2$ independently of one another stand for hydrogen, a lower alkyl radical or an optionally substituted aryl radical with the proviso that at least one of the symbols $R_1$ or $R_2$ stands for an optionally substituted aryl radical, while $X_1$ and $X_2$, independently of one another, denote hydrogen, the sulphonic acid group or a salt thereof, a sulphonic acid ester group, an optionally substituted sulphonic acid amide group, an alkylsulphone or arylsulphone group, the carboxylic acid group or a salt thereof, a carboxylic acid ester group, an optionally substituted carboxylic acid amide group or cyanogen and Y stands for hydrogen, an acylated amino group, an optionally substituted pyrazolyl triazolyl-(1), benzotriazolyl or naphthotriazolyl group.

Suitable aryl radicals for which the symobls $R_1$ and $R_2$ can stand, are the phenyl and naphthyl radicals; examples of substituents for these radicals are halogen, cyanogen, alkyl, alkoxy, acylamino, sulphonamide, alkylsulphone, arysulphone and carboxylic acid or sulphonic acid groups or salts thereof. Suitable substituents for the pyrazolyl and triazolyl-(1) groups which may be represented by the symbol Y are those radicals which can be represented by the symbols $R_1$ and $R_2$; benzotriazolyl and naphthotriazolyl groups can be substituted by alkyl, alkoxy, carbcarboxyl and/or sulphonic acid groups or salts thereof.

Preferred phenyl groups $R_1$ and $R_2$ are those having alkyl groups with 1-4 carbon atoms and/or alkoxy groups with 1-4 carbon atoms and/or fluoro, chloro or bromo substituents and/or sulfonic acid groups and/or carboxylic acid groups or salts thereof, for example the phenyl groups listed below:

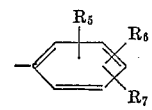

| No. | $R_5$ | $R_6$ | $R_7$ |
|---|---|---|---|
| 1 | H | H | $CH_3$ |
| 2 | H | H | $C_2H_5$ |
| 3 | H | H | $C_3H_7$ |
| 4 | H | H | $C_4H_9$ |
| 5 | H | H | $OCH_3$ |
| 6 | H | H | $OC_3H_9$ |
| 7 | H | H | Cl |
| 8 | H | H | Br |
| 9 | H | H | F |
| 10 | H | H | COONa |
| 11 | H | H | $SO_3Na$ |
| 12 | H | $CH_3$ | $SO_2Na$ |
| 13 | H | $C_2H_5$ | $SO_3Na$ |
| 14 | H | Cl | $SO_3Na$ |
| 15 | H | Br | $SO_3Na$ |
| 16 | H | $OCH_3$ | $SO_3Na$ |
| 17 | H | $OC_2H_5$ | $SO_2Na$ |

Suitable lower alkyl groups $R_1$ and $R_2$ are for example $CH_3$, $C_2H_5$, $C_3H_7$, $C_4H_9$ which may have substituents as for example Cl and CN.

The arylpyrazolyl-(1)-stilbene compounds of the present invention are suitable for brightening a great variety of materials, for example, for brightening cellulose materials, such as cotton and paper, or wool, further for brightening synthetic materials, such as fibres, filaments, foils or plastic masses of polyamides, polyesters, polyacrylonitrile, polyvinyl chloride and cellulose acetates, and also for brightening lacquers of cellulose acetates or for brightening soap.

For brightening cotton, wool and synthetic polyamides, those arylpyrazolyl-(1)-stilbene compounds are primarily suitable which correspond to the Formula I in which Y stands for an optionally substituted pyrazolyl, triazolyl-(1), benzotriazolyl, naphthotriazolyl or acylamino groups, and $X_1$ and $X_2$ denote the sulphonic acid group or salts thereof. Those compounds of the Formula I which are free from sulphonic acid groups are primarily suitable for brightening materials of polyesters, polyvinyl chloride and cellulose acetates.

The brightening agents can be applied in the usual manner, for example, in the form of aqueous solutions or dispersions or in the form of solutions in organic solvents, such as ethylene glycol monomethyl ether, dimethyl formamide and triethanolamine. If desired, the brightening agents can also be used in combination with detergents or they can be added to casting masses serving for the production of foils or filaments. Those brightening agents which contain carboxylic acid, carboxylic acid ester or carboxylic acid amide groups can also be used for the production of fluorescent shaped articles from synthetic polycondensates according to the process of French patent specification No. 1,155,365. The necessary amounts can easily be established for each case by preliminary experiments; in general, amounts of 0.1 to 1%, referred to the material to be brightened, have proved sufficient.

Arylpyrazolyl-(1)-stilbene compounds of the above Formula I can be produced in various ways.

Arylpyrazolyl-(1)-stilbene compounds of Formula I of symmetrical structure wherein $R_1$ stands for hydrogen, a lower alkyl group or an optionally substituted aryl group and $R_2$ denotes a lower alkyl group or an optionally substituted aryl group can be obtained, for example, by condensing stilbene compounds of the formula

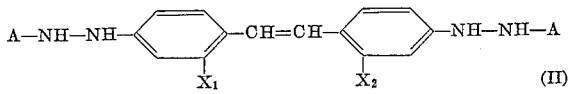

in which $X_1$ and $X_2$ have the same meaning as above and A stands for an organic acyl radical or for the sulphonic acid group, with vinyl ketones of the formula

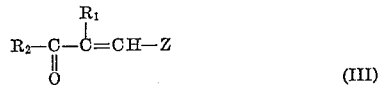

in which $R_1$ and $R_2$ have the same meaning as above and Z stands for the hydroxyl group, an alkoxy group, an acyloxy group, a dialkylamino group or chlorine, and cyclising the condensation products obtained, with the splitting off of A—OH. If desired, substituents can subsequently be introduced into the aryl radicals, or substituents there present can be converted.

Examples of vinyl ketones of the Formula III are: phenyl-β-hydroxyvinyl ketone, p-tolyl-β-hydroxyvinyl ketone, p-anisyl-β-hydroxyvinyl ketone, α- or β-naphthyl-β-hydroxyvinyl ketone, phenyl-β-methoxyvinyl ketone, phenyl-β-chlorovinyl ketone, o-, m- or p-chlorophenyl-β-chlorovinyl ketone, o-, m- or p-tolyl-β-chlorovinyl ketone, o-, m- or p-anisyl-β-chlorovinyl ketone, m- or p-nitrophenyl-β-chlorovinyl ketone, phenyl-(α-methyl-β-hydroxyvinyl) ketone, phenyl-(α-ethyl-β-hydroxyvinyl) ketone, methyl-(α-phenyl-β-hydroxyvinyl) ketone and phenyl-(α-phenyl-β-hydroxyvinyl) ketone.

Arylpyrazolyl-(1)-stilbene compounds of the Formula I wherein $R_1$ stands for hydrogen, a lower alkyl group or an optionally substituted aryl group and $R_2$ denotes a lower alkyl group or an optionally substituted aryl group which have an asymmetrical structure can be obtained, for example, by condensing stilbene compounds of the formula

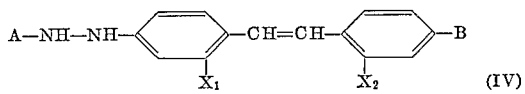

in which $X_1$, $X_2$ and A have the same meaning as above and B stands for one of the substituents characterised above by Y or for the nitro group, with vinyl ketones of the Formula III, cyclising the condensation products, and, in those cases where B stands for the nitro group, converting the nitro group in known manner into an acylated amino group, an optionally substituted pyrazolyl, triazolyl-(1), benzotriazolyl or naphthotriazolyl group.

Symmetrical arylpyrazolyl-(1)-stilbene compounds of the above Formula I wherein $R_1$ stand for an optionally substituted aryl group and $R_2$ denotes hydrogen can be obtained, for example, by condensing stilbene compounds of the formula

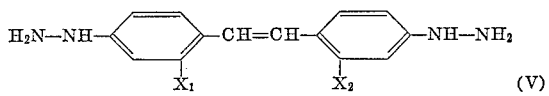

in which $X_1$ and $X_2$ have the same meaning as above, by known methods with arylmalonic dialdehydes of the formula

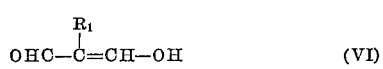

in which $R_1$ stands for an optionally substituted aryl group or with functional derivatives, for example, with α-aryl-β-dialkyl-amino-acroleins or with anils, acetals or bisulphite compounds of aryl-malonic dialdehydes, and cyclising the condensation products. If desired, substituents can subsequently be introduced into the radical $R_1$, or substituents there present can be converted.

Arylpyrazolyl-(1)-stilbene compounds of Formula I wherein $R_1$ stands for an optionally substituted aryl group and $R_2$ denotes hydrogen, having an asymmetrical structure can be obtained, for example, by condensing stilbene compounds of the formula

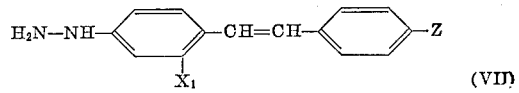

in which $X_1$ and $X_2$ have the same meaning as above, and Z stands for one of the substituents characterised above by Y, or for the nitro group, with arylmalonic dialdehydes of the Formula VI or their functional derivatives, cyclising the condensation products, and in the case where Z stands for the nitro group, converting the nitro group in known manner into an acylated amino group, an optionally substituted pyrazolyl, triazolyl-(1), benzotriazolyl or naphthotriazolyl group.

The brightenings achieved with the agents of the present invention are eminently fast to chlorine and chlorite and also very fast to light.

EXAMPLE 1

An unbleached cotton fabric is moved about for 30 minutes in a liquor ratio of 1:20 and at 70 to 80° C. in an aqueous liquor containing, per litre, 0.06 g. of one of the brightening agents characterised below by (a) to (g). The fabric is subsequently rinsed and dried. It then exhibits a clear strong brightening which has an excellent fastness to chlorine and good fastness to light.

The brightening agents (a) to (g) concerned are compounds of the formula

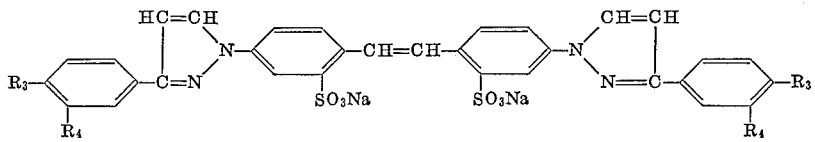

in which $R_3$ and $R_4$ have the meaning set out in the table.

| Brightening agent | $R_3$ | $R_4$ |
|---|---|---|
| (a) | H | H |
| (b) | $CH_3$ | H |
| (c) | Cl | H |
| (d) | $OCH_3$ | H |
| (e) | $O-CH_2-COOH$ | H |
| (f) | H | COOH |
| (g) | $SO_3Na$ | H |

The brightening agent (a) was prepared in the following manner:

40 g (0.1 mole) 4,4'-dihydrazinostilbene-2,2'-disulphonic acid were stirred in 450 ml. of water with the addition of an aqueous solution of 8 g. sodium hydroxide; the solution was then treated dropwise, with further stirring, with 23 g. (0.22 mole) acetic anhydride, while the temperature was kept at about 30° C. and the pH value was kept at about 5 by the addition of a sodium carbonate solution. After half an hour, free hydrazino groups could no longer be detected by means of o-naphthoquinone-sulphonic acid. Subsequently, there were added at 60 to 65° C. 0.25 g. of a commercial nonionic emulsifier and, within half an hour, a solution of 36 g. (0.22 mole) phenyl-β-methoxyvinyl ketone in 350 ml. methanol. The mixture was stirred for a further 3 hours at 60–65° C. and pH 5, and then cooled. The condensation product formed was mixed dropwise, while stirring, with 60 ml. of concentrated hydrochloric acid. The resultant red precipitate was filtered off with suction, dissolved at 75° C. in 650 ml. of 75% aqueous methyl glycol, mixed with 80 ml. of concentrated hydrochloric acid, and then stirred first for 3 hours at 75° C. and then for a further hour at 100° C. Thereafter, about ⅔ of the solvent were distilled off under reduced pressure and the residue was stirred into 400 ml. of a 10% sodium chloride solution. The red brightening agent (a) thereby precipitated was purified by repeated recrystallisation from hot water. The brightening agent so obtained is a greenish yellow powder which dissolves in water with a strong blue fluorescence.

The brightening agents characterised by (b), (c) and (d) were obtained by replacing the phenyl-β-methoxyvinyl ketone with the equivalent amount of p-tolyl-β-methoxyvinyl ketone, p-chlorophenyl-β-methoxyvinyl ketone or p-anisyl-β-methoxyvinyl ketone. The brightening agent (e) was prepared from the compound (d) by splitting off the methoxy groups by heating in pyridine hydrochloride and reacting the resultant hydroxyl groups with chloroacetic acid in the presence of sodium hydroxide.

The brightening agent (f) was prepared in the following manner:

0.1 mole 4,4'-bis-acetylhydrazino-stilbene-2,2'-disulphonic acid was condensed in the manner described above with 0.22 mole m-nitrophenyl-β-chlorovinyl ketone and the bis-nitrophenyl-pyrazolyl-stilbene compound was formed by cyclisation; this compound was dissolved in dimethyl formamide and reduced with hydrogen in the presence of Raney nickel, the resultant bis-aminophenyl-pyrazolyl-stilbene compound was diazotised, the bis-diazo compound was reacted with copper (I) cyanide to form the bis-cyanophenyl-pyrazolyl-stilbene compound, and this compound was then hydrolysed with 70% sulphuric acid.

The brightening agent (g) was obtained by sulphonation of 1 mole 4,4'-bis-acetyl-hydrazinostilbene-2,2'-disulacid.

EXAMPLE 2

Unbleached cotton yarn is moved about for one hour in a liquor ratio of 1:20 at 85 to 95° C. in an aqueous bath containing, per litre, 0.06 g. of the brightening agent of the formula

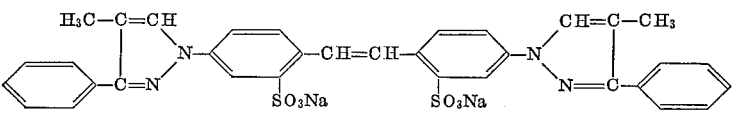

and 2 g. sodium chlorite. After rinsing and drying, the treated yarn exhibits a clear strong brightening.

The brightening agent used was prepared by condensation of 1 mole 4,4'-bis-acetyl-hydrazinostilbene-2,2'-disulphonic acid with 2,2 mole phenyl-(α-methyl-β-hydroxyvinyl) ketone (α-formylpropiophenone) according to the instructions given in Example 1.

Similar results are obtained if instead of the above cited brightening agent, the brightening agent of the formula

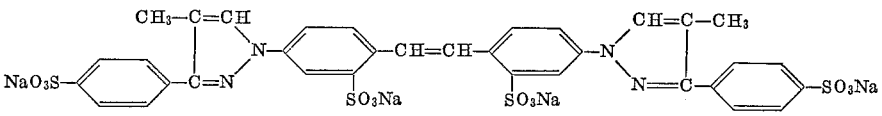

is used.

This compound can be obtained by sulfonating the above cited compound with concentrated sulfuric acid and transforming the thus obtained compound into the salt.

EXAMPLE 3

Unbleached cotton yarn is moved about for one hour at 60° C. in a liquor ratio of 1:20 in an aqueous bath containing, per litre, the amount of sodium hypochlorite corresponding to 2 g. of active chlorine, as well as 0.06 g. of one of the brightening agents described in Examples 1 and 2. Clear neutral brightenings are obtained in all cases.

EXAMPLE 4

White laundry goods are washed in a liquor ratio of 1:20 at 90 to 100° C. in a washing liquor containing, per litre, 10 g. of a commercial anion-active detergent and 0.1 g. of one of the brightening agents described in Example 1, Example 2 or below under (a) to (d). After rinsing and drying, the laundry goods are very well brightened.

The brightening agents (a) to (d) concerned are compounds of the formula

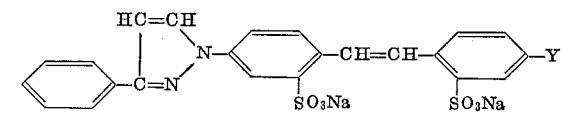

in which Y has the meaning set out in the table.

Brightening Agent

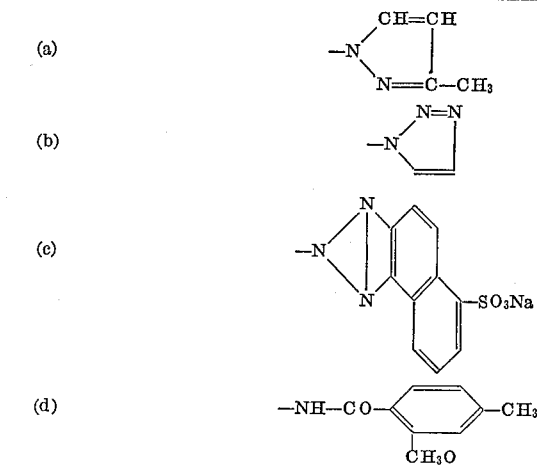

The brightening agent (a) was prepared by condensing 4-[3-methylpyrazolyl-(1)]-4'-acetyl-hydrazinostilbene-2,2'-disulphonic acid which had been obtained from 4-[3-methylpyrazolyl-(1)]-4'-aminostilbene-2,2'-disulphonic acid by diazotisation, reduction, reduction of the resultant diazo compound with sodium sulphite and subsequent acetylation, in the manner described in Example 1 with phenyl-β-hydroxyvinyl ketone, followed by cyclisation.

The brightening agent (b) was prepared by condensing 4-acetylhydrazino-4'-[triazolyl-(1)]-stilbene-2,2'-disulphonic acid which had been obtained from 4-amino-4'-[triazolyl-(1)]-stilbene-2,2'-disulphonic acid by diazotisation, reduction of the resultant diazo compound with sodium sulphite and subsequent acetylation, with phenyl-β-hydroxyvinyl ketone, followed by cyclisation.

The brightening agent (c) was prepared in the following manner:

4-hydrazino-4'-nitrostilbene-2,2'-disulphonic acid was acetylated in the manner described in Example 1, condensed with phenyl-β-hydroxyvinyl ketone, followed by cyclisation. The resultant nitrostilbene compound was reduced with iron and acetic acid to form 4-[3-phenylpyrazolyl-(1)]-4'-aminostilbene-2,2'- disulphonic acid, the diazo compound prepared therefrom in the usual manner was coupled with 2 - aminonaphthalene - 5 - sulphonic acid and the resultant azo compound was oxidised with an ammoniacal copper sulphate solution to form the corresponding naphthotriazole.

The brightening agent (d) was obtained by acylation of 4 - [3 - phenylpyrazolyl - (1)] - 4' - aminostilbene-2,2' - disulphonic acid with o-methoxy-p-toluyl chloride.

EXAMPLE 5

1 kg. of curd soap is mixed with 1 g. of one of the brightening agents described in Example 1 to form a homogeneous mass. The soap thus treated has a substantially whiter appearance in daylight than the untreated soap.

EXAMPLE 6

Fabrics of fibers produced from poly-ε-caprolactam are moved about for 30 minutes in a liquor ratio of 1:40 at 80 to 90° C. in an aqueous bath containing, per litre, 0.2 g of one of the brightening agents described in Example 1 or 2. After rinsing and drying, the fabrics exhibit a strong clear brightening of good fastness to light and excellent fastness to chlorite.

EXAMPLE 7

Fabrics of fibers produced from a hexamethylene-diamine-adipic acid polycondensate are moved about for 30 minutes at 90 to 95° C. in a liquor ratio of 1:40 in a bath containing, per litre, 0.2 g. of one of the brightening agents described in Example 1 or 2 and 2 g. sodium chloride. After rinsing and drying, the fabrics exhibit a very clear brightening which is fast to light.

EXAMPLE 8

A mixture of 900 g. ε-caprolactam, 100 g. ε-aminocapronic acid, 0.5 g. acetic acid, 13.5 g. titanium dioxide and 4 g. of the brightening agent described in Example 1 under (e) or (f) is heated in a container of stainless steel at 260° C. under atmospheric pressure for 5 hours. The resultant polyamide melt is worked up in known manner into chips and the chips are then spun into filaments with a final titre of 90/25. Very clear brightenings of excellent fastness to wet processing are obtained.

EXAMPLE 9

65 parts by weight of a polyvinyl chloride with a K-value of 72 to 74 prepared by emulsion polymerization, 35 parts dioctyl phthalate, 2 parts by weight of a commercial organic tin-containing stabiliser, 1 part by weight titanium dioxide (rutile) and 0.1 part by weight of one of the brightening agents characterised below by (a) to (d) are rolled on a hot roller with low friction at 165° C. for about 5 minutes with varying openings of the gap between the rollers, and the rough sheet obtained is drawn off on a four-roller calender to produce a foil of about 300μ thickness. The foil then exhibits a strong brightening.

The brightening agents concerned are compounds of the formula

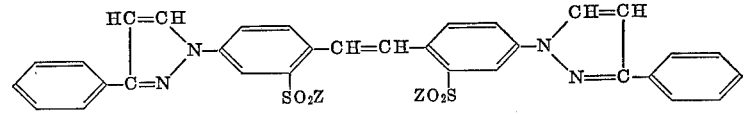

in which Z has the meaning set out in the table.

| Brightening agent: | Z |
|---|---|
| (a) | $N(C_2H_5)_2$ |
| (b) | $N(C_3H_7)_2$ |
| (c) | $N(C_4H_9)_2$ |
| (d) | $N(i-C_4H_9)_2$ |

The brightening agent (a) was prepared in the following manner:

669 g. (1 mole) of the sodium salt of 4,4'-bis-[3-phenylpyrazolyl-(1)] - stilbene-2,2' - disulphonic acid described in Example 1 were stirred with 4 litres phosphorus oxychloride, the mixture was gradually mixed with 450 g. phosphorus pentachloride, heated with stirring to the boiling point of the phosphorus oxychloride and stirred at this temperature for a further 2 hours. After the evolution of hydrogen chloride had subsided, the phosphorus oxychloride was distilled off under reduced pressure and the residue was thoroughly stirred with cold water. The yellow 4,4'-bis[3-phenylpyrazolyl-(1)]-stilbene-2,2'-disulphochloride so obtained was filtered off with suction, washed with cold water until free from acid and dried in a vacuum desiccator. 20 g. of this bis-sulphochloride were vigorously stirred with an excess of an aqueous diethylamine solution for about 4 hours. The resultant light-coloured bis-sulphodiethylamide was filtered off with suction, washed with water, recrystallised from dimethyl formamide and dried.

The brightening agents (b) to (d) were obtained in analogous manner by reacting the bis-sulphochloride described above with the appropriate amines.

EXAMPLE 10

An unbleached cotton fabric is moved about for 30 minutes in a liquor ratio of 1:20 at 70 to 80° C. in an aqueous bath containing, per litre, 0.06 g. of the brightening agent of the formula

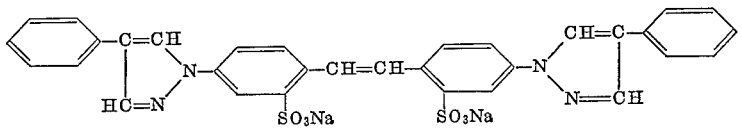

The fabric is subsequently rinsed and dried. It then exhibits a clear strong brightening effect which has excellent fastness to chlorine and good fastness to light.

The brightening agent used was prepared in the following manner:

40 g. (0.1 mole) 4,4'-dihydrazinostilbene-2,2'-disulphonic acid were stirred in 500 ml. of 75% glycol monomethyl ether with the addition of an aqueous solution of 8 g. sodium hydroxide, the mixture was then mixed at 60° C. with a solution of 32.6 g. (0.22 mole) phenylmalonic dialdehyde and 45 g. acetic acid in 200 ml. glycol monomethyl ether, and stirred at 85 to 90° C. for one hour; after this period of time, free hydrazino groups could no longer be detected. The mixture was subsequently mixed with concentrated hydrochloric acid until the reaction was strongly alkaline, heated at boiling temperature under reflux for 6 hours, then cooled and diluted with water. The resultant precipitate was filtered off, stirred with an excess of sodium carbonate solution, again filtered off, purified by repeated recrystallisation from isopropanol/water, and then dried. The brightening agent so obtained is a greenish yellow powder which dissolves in water with a strong blue fluorescence.

EXAMPLE 11

Unbleached cotton yarn is mixed about for one hour in a liquor ratio of 1:20 at 85 to 95° C. in an aqueous bath containing, per litre, 0.06 g. of the brightening agent of the formula

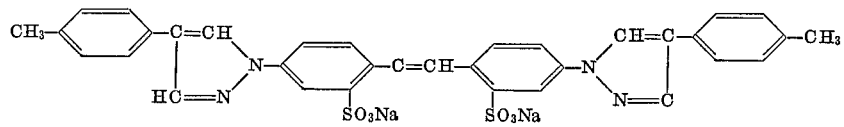

and 2 g. sodium chlorite. After rinsing and drying, the treated yarn exhibits a clear strong brightening effect.

The brightening agent used was obtained by condensation of 1 mole 4,4'-dihydrazino-stilbene-2,2'-disulphonic acid with 2.2 moles p-tolyl-malonic dialdehyde according to the instructions given in Example 10.

Similar results are obtained when the brightening agent cited above is replaced by the brightening agent of the formula

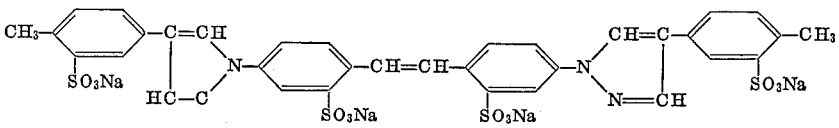

This compound is obtained by sulfonating the above cited compound with sulfuric acid and transforming the thus obtained compound into the salt.

EXAMPLE 12

Unbleached cotton yarn is moved about for one hour at 60° C. in a liquor ratio of 1:20 in an aqueous bath containing, per litre, the amount of sodium hypochlorite corresponding to 2 g. of active chlorine as well as 0.08 g. of one of the brightening agents described in Example 1 or 2 or 0.1 g. of the sodium salt of 4,4'-bis-[4-(phenylsulphonic acid) - pyrazolyl - (1)] - stilbene - 2,2' - disulphonic acid or 0.1 g. of the sodium salt of 4,4'-bis-[4-(p-tolylsulphonic acid) - pyrazolyl - (1)] - stilbene - 2,2'-disulphonic acid. A clear neutral brightening effect is achieved in all cases.

The tetrasulphonic acids on which the two last-mentioned brightening agents are based were obtained by sulphonation of the brightening agents described in Examples 10 and 11 with concentrated sulphuric acid.

EXAMPLE 13

White laundry goods are washed in a liquor ratio of 1:20 at 90 to 100° C. in a washing liquor containing, per litre, 10 g. of a commercial anion-active detergent and 0.1 g. of one of the brightening agents described in Example 10, Example 11 or below under (a) to (d). After rinsing and drying, the white laundry goods are very well brightened.

The brightening agents (a) to (d) are compounds of the formula

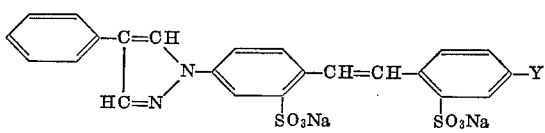

in which Y has the meaning given in the table.

| Y | Y |
|---|---|
| (a) 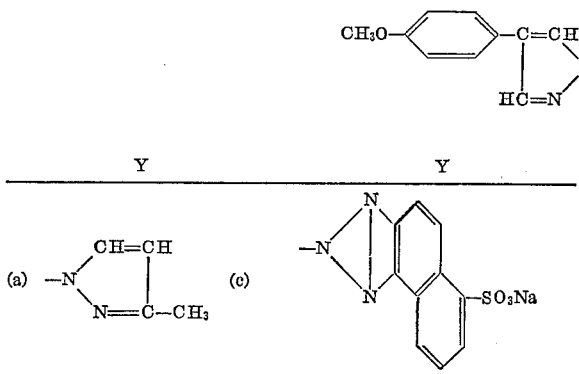 | (b) 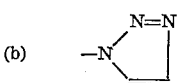 (c) 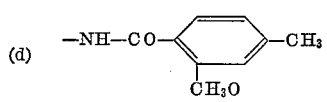 (d) 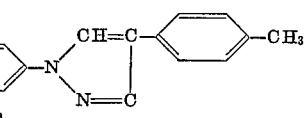 |

The brightening agent (a) was prepared by condensing 4 - [3 - methylpyrazolyl - (1)] - hydrazinostilbene - 2,2'-disulphonic acid which had been obtained from 4-[3-methylpyrazolyl - (1)] - 4' - aminostilbene - 2,2' - disulphonic acid by diazotisation and reduction of the resultant

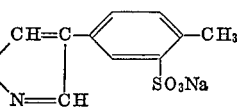

diazo compound with sodium sulphite, in the manner described in Example 10 with phenyl-malonic dialdehyde, followed by cyclisation.

The brightening agent (b) was prepared by condensing 4 - hydrazino - 4' - [triazolyl -(1)] - stilbene - 2,2' - disulphonic acid which had been obtained from 4-amino-4' - [triazolyl - (1)] - stilbene - 2,2' - disulphonic acid by diazotisation and reduction of the resultant diazo compound with sodium sulphite, with phenylmalonic dialdehyde, followed by cyclisation.

The brightening agent (c) was prepared in the following manner:

4 - hydrazino - 4' - nitrostilbene - 2,2' - disulphonic acid was condensed in the manner described in Example 1 with phenylmalonic dialdehyde, followed by cyclistion. The resultant nitrostilbene compound was reduced with iron and acetic acid to form the 4-[4-phenyl-pyrazolyl - (1)] - 4' - aminostilbene - 2,2' - disulphonic acid, the diazo compound prepared therefrom in the usual manner was coupled with 2-aminonaphthalene-5-sulphonic acid and the resultant azo compound was oxidised with an ammoniacal copper sulphate solution to form the corresponding naphthotriazole.

The brightening agent (d) was obtained by acylation of 4 - [4 - phenylpyrazolyl - (1)] - 4' - aminostilbene-2,2'-disulphonic acid with o-methoxy-p-toluyl chloride.

EXAMPLE 14

1 g. of curd soap is mixed with 1 g. of the brightening agent described in Example 10 to form a homogeneous mass. The soap thus treated has a substantially whiter appearance in daylight than the untreated soap.

EXAMPLE 15

Fabrics of fibres produced from poly-ε-caprolactam are moved about for 30 minutes in a liquor ratio of 1:40 at 80 to 90° C. in an aqueous bath containing, per litre, 0.2 g. of one of the brightening agents described in Example 10, 11 or 12 or the brightening agent of the formula

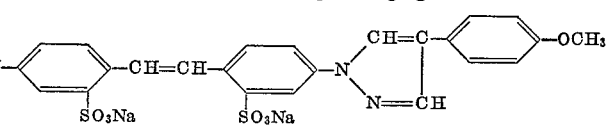

which may be obtained according to the reaction condition given in Example 10 by condensation of 4,4'-dihydrazino-stilbene-2,2'-disulfonic acid with anisylmalonic dialdehyde. After rinsing and drying, the fabrics exhibit a strong clear brightening effect of good fastness to light and excellent fastness to chlorite.

EXAMPLE 16

Fabrics of fibres produced from a hexamethylene-diamine-adipic acid polycondensate are moved about for 30 minutes at 90 to 95° C. in a liquor ratio of 1:40 in a bath containing, per litre, 0.2 g. of one of the brightening agents described in Example 10, 11, or 12 as well as in Example 4 under (a) and (b), and 2 g. sodium chlorite. After rinsing and drying, the fabrics exhibit a very clear brightening effect which is fast to light.

EXAMPLE 17

65 parts by weight of a polyvinyl chloride with a K-value of 72 to 74 prepared by emulsion polymerisation, 35 parts by weight dioctyl phthalate, 2 parts by weight of a commercial organic tin-containing stabiliser, 1 part by weight titanium dioxide (rutile), and 0.1 part by weight of one of the brightening agents characterised below under (a) to (l) are rolled on a hot roller with low friction at 165° C. for about 5 minutes with varying openings of the gap between the rolls, and the rough sheet so obtained is drawn off on a four-roll calender to produce a foil of about 300µ thickness. The foil then exhibits a strong brightening effect.

The brightening agents concerned are compounds of the formula

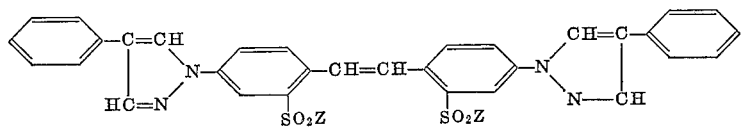

in which Z has the meaning given in the table.

| | Z | | Z |
|---|---|---|---|
| (a) | N(CH$_3$)$_2$ | (h) | 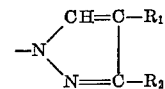 |
| (b) | NH—C$_2$H$_5$ | | |
| (c) | N(C$_2$H$_5$)$_2$ | | |
| (d) | N(C$_3$H$_7$)$_2$ | (i) | O—⟨⟩ |
| (e) | NH—i—C$_3$H$_7$ | | |
| (f) | N⟨⟩ | (k) | 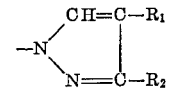 |
| (g) | N⟨O⟩ | | |
| | | (l) | O—⟨⟩—Cl |

The brightening agent (a) was prepared in the following manner:

669 g. (1 mole) of the sodium salt of 4,4'-bis-[4-phenyl-pyrazolyl-(1)]-stilbene-2,2'-disulphonic acid described in Example 1 were stirred with 4 litres phosphorus oxychloride, the mixture was gradually mixed with 450 g. phosphorus pentachloride, heated with stirring to the boiling point of the phosphorus oxychloride and stirred at this temperature for a further 2 hours. After the evolution of hydrogen chloride had subsided, the phosphorus oxychloride was distilled off under reduced pressure and the residue was thoroughly and intensely stirred with cold water. The yellow 4,4'-bis-[4-phenylpyrazolyl-(1)]-stilbene-2,2'-disulphochloride so obtained was filtered off with suction, washed with cold water until free from acid, and dried in a vacuum desiccator. 20 g. of this bis-sulphochloride were vigorously stirred with an excess of an aqueous dimethylamine solution for about 4 hours. The resultant pale-coloured bis-sulpho-dimethylamide was filtered off with suction, washed with water, recrystallised from dimethyl formamide and dried.

The brightening agents (b) to (l) were obtained in an analogous manner by reacting the bis-sulphochloride mentioned above with the appropriate amines or alkali metal phenolates.

We claim:
1. Arylpyrazolyl-(1)-stilbene compound of the formula

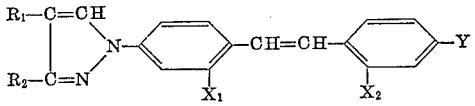

wherein R$_1$ and R$_2$, being the same or different, are hydrogen, lower alkyl, phenyl, naphthyl, substituted phenyl or substituted naphthyl, the substituents on said phenyl and naphthyl being halogen, cyanogen, lower alkyl, lower alkoxy, sulphonamide, lower alkyl sulphone, phenyl sulphone, carboxylic acid, carboxylic acid salt or sulphonic acid salt, at least one of said R$_1$ and R$_2$ being a phenyl, naphthyl, substituted phenyl or substituted naphthyl group; X$_1$ and X$_2$, being the same or different, are hydrogen, sulphonic acid, sodium sulphonate, sulphonic acid amide, phenyl substituted sulphonic acid amide, lower alkyl substituted sulphonic acid amide, lower alkyl ester of sulphonic acid, phenyl ester of sulphonic acid, lower alkyl substituted phenyl ester of sulphonic acid, carboxylic acid, carboxylic acid salt, carboxylic amide or cyanogen; and Y is $$-N\begin{matrix}CH=C-R_1\\ \\N=C-R_2\end{matrix}$$

triazolyl, benzotriazolyl, naphthotriazolyl, benzoylamino, substituted triazolyl, substituted benzotriazolyl, substituted naphthotriazolyl, or substituted benzoylamino, the substituents being halogen, lower alkyl, lower alkoxy, or sulphonic acid groups.

2. The arylpyrazolyl-(1)-stilbene compound of claim 1 wherein Y is $$-N\begin{matrix}CH=C-R_1\\ \\N=C-R_2\end{matrix}$$

3. The arylpyrazolyl-(1)-stilbene of claim 2 wherein R$_2$ is hydrogen and X$_1$ and X$_2$ are sulphonic acid groups or sulphonic acid salts.

4. The arylpyrazolyl-(1)-stilbene of claim 3 wherein R$_1$ is a phenyl group or a substituted phenyl group wherein the substituents are C$_2$ to C$_4$ alkyl groups, C$_1$ to C$_4$ alkoxy groups, halogen, sulphonic acid or sulphonic acid salt.

5. The arylpyrazolyl-(1)-stilbene of claim 1 wherein R$_1$ is hydrogen and X$_1$ and X$_2$ are sulphonic acid groups or sulphonic acid salts.

6. The arylpyrazolyl-(1)-stilbene of claim 5 wherein R$_1$ is a phenyl group or a substituted phenyl group wherein the substituents are C$_2$ to C$_4$ alkyl groups, C$_1$ to C$_4$ alkoxy groups, halogen, sulphonic acid or sulphonic acid salt.

7. The arylpyrazolyl-(1)-stilbene compound of the formula:

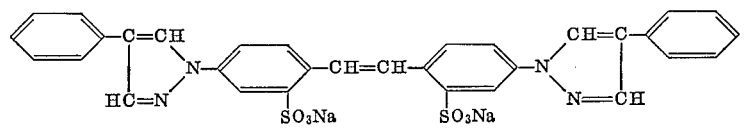

8. The arylpyrazolyl-(1)-stilbene compound of the formula:
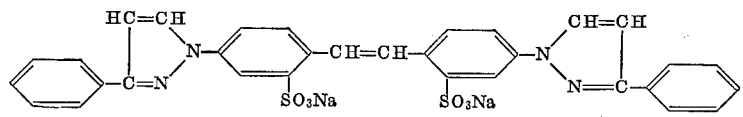
References Cited
UNITED STATES PATENTS
3,123,617  3/1964  Hausermann.
2,901,476  8/1959  Gold et al. _____ 260—240
FOREIGN PATENTS
534,862  10/1955  Italy.
878,942  10/1961  Great Britain.
OTHER REFERENCES
Derwent Belgian Patents Report No. 47/66, Group 2, page 3.
JOHN D. RANDOLPH, *Primary Examiner.*
U.S. Cl. X.R.
106—176; 117—33.5; 252—89, 117, 301.2; 260—37, 141, 508, 569, 584, 591

UNITED STATES PATENT OFFICE

CERTIFICATE OF CORRECTION

Patent No: 3,449,333            Dated: June 10, 1969

Alfons Dorlars, et al.

It is certified that errors appear in the above-identified patent and that said Letters Patent is hereby corrected as shown below:

Column 1, line 61, "Synobls" should be changed to --- symbols ---.

Column 2, phenyl group listing No. 6, "OC$_3$H$_9$" should be changed to --- OC$_4$H$_9$ ---; No. 17, "SO$_2$Na" should be changed to --- SO$_3$Na ---.

Column 4, Formula VII, " =CH-⟨ ⟩-Z should be changed to

--- 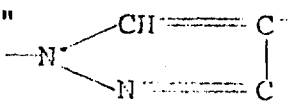 ---.

Column 5, line 35, "1 mole 4,4'-bis-acetyl-hydrazino-stilbene-2,2'-disul-acid." should be changed to --- the compoun (a) with concentrated sulphuric acid. ---; line 51, "4,4'-bis-acteyl-hydrazino-stilbene-" should be changed to --- 4,4'-bis-acetyl-hydrazino-stilbene- ---.

Column 6, Table, the heading "Y" is missing; line 37, the formula substituent "CH$_3$O" should be changed to --- OCH$_3$ ---; lines 49-50, "diazotisation, reduction, reduction of the" should be changed to --- diazotisation, reduction of the ---.

Column 9, Formula after line 2, "  "

should be changed to --- 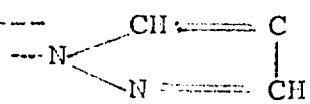 ---;

Patent No. 3,449,333
Page 2

Column 9, Formula after line 16, " 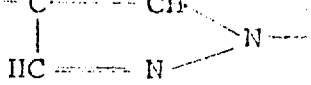 "

should be changed to --- 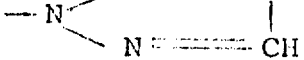 ---.

Column 10, line 11, the formula substituent "$\overset{|}{C}H_3O$" should be changed to --- $\overset{|}{O}CH_3$ ---; line 38, "cyclistion." should be changed to --- cyclisation. ---.

Column 11, line 28, the formula portion " $-N\overset{CH=\!=\!=C-}{\underset{N-\!-\!-\!CH}{\phantom{X}}}\overset{|}{\phantom{X}}$ "

should be changed to --- $-N\overset{CH=\!=\!=C-}{\underset{N=\!=\!=CH}{\phantom{X}}}\overset{|}{\phantom{X}}$ ---.

SIGNED AND SEALED

APR 7 1970

(SEAL)
Attest:

Edward M. Fletcher, Jr.
Attesting Officer

WILLIAM E. SCHUYLER, JR.
Commissioner of Patents